Nov. 20, 1962 C. C. ALLEN, JR 3,065,115

METHOD FOR FABRICATING TRANSISTORS HAVING DESIRED CURRENT-TRANSFER RATIOS

Filed Dec. 29, 1959 4 Sheets-Sheet 1

INVENTOR

Chester C. Allen, Jr.

BY

Stevens, Davis, Miller & Mosher

ATTORNEYS

Nov. 20, 1962 C. C. ALLEN, JR 3,065,115

METHOD FOR FABRICATING TRANSISTORS HAVING DESIRED CURRENT-TRANSFER RATIOS

Filed Dec. 29, 1959 4 Sheets-Sheet 2

INVENTOR

Chester C. Allen, Jr.

BY

Stevens, Davis, Miller & Mosher

ATTORNEYS

Nov. 20, 1962 C. C. ALLEN, JR 3,065,115
METHOD FOR FABRICATING TRANSISTORS HAVING DESIRED CURRENT-TRANSFER RATIOS
Filed Dec. 29, 1959 4 Sheets-Sheet 3

INVENTOR
Chester C. Allen, Jr.

BY
Stevens, Davis, Miller & Mosher
ATTORNEYS

Nov. 20, 1962

C. C. ALLEN, JR 3,065,115

METHOD FOR FABRICATING TRANSISTORS HAVING DESIRED CURRENT-TRANSFER RATIOS

Filed Dec. 29, 1959

4 Sheets-Sheet 4

INVENTOR

Chester C. Allen, Jr.

BY

Stevens, Davis, Miller & Mosher

ATTORNEYS 3,065,115

METHOD FOR FABRICATING TRANSISTORS HAVING DESIRED CURRENT-TRANSFER RATIOS

Chester C. Allen, Jr., Grapevine, Tex., assignor to Texas Instruments Incorporated, Dallas, Tex., a corporation of Delaware Filed Dec. 29, 1959, Ser. No. 862,585
4 Claims. (Cl. 148—1.5)

The present invention relates to the manufacture of semiconductor devices, and more particularly to a grown-diffused technique for fabricating a plurality of semiconductor crystals in which the widths of the base layers are carefully controlled so that the group of transistors fabricated from each crystal have a different and relatively narrow preselected range of current-transfer ratios.

In characterizing transistor performance, it has become useful to define several parameters which are descriptive of the transistor behavior. Among these is the current-transfer ratio. The current-transfer ratio is normally designated $\alpha$ if the measurements are made using a common base connection. If a common emitter connection is used, the current-transfer ratio is commonly designated $\beta$. The current-transfer ratio $\alpha$ is defined as $$\alpha=\frac{\Delta I_c}{\Delta I_e}$$

where $I_c$ is the collector current and $I_e$ is the emitter current of the transistor. The current-transfer ratio $\beta$ is defined as $$\beta=\frac{\Delta I_c}{\Delta I_b}$$

where $I_c$ is the collector current and $I_b$ is the base current of the transistor. The terms $\alpha$ and $\beta$ may each refer either to the A.-C. or D.-C. transformation ratio. To eliminate any possibility of confusion, it has become common to refer to the D.-C. $\alpha$ as $h_{FB}$ and the A.-C. $\alpha$ as $h_{fb}$. Similarly, the D.-C. $\beta$ is noted $h_{FE}$, and the A.-C. $\beta$ is referred to as $h_{fe}$.

One of the requirements for stable transistor action is that the alpha of the transistor be less than 1. For transistors in which alpha is less than 1, $$\beta=\frac{\alpha}{1-\alpha}$$

Because of this relationship, it is readily observed that at least some of the factors which affect the beta of the transistor also affect the alpha of the transistor. One of the more important factors which affect both the alpha and beta of the transistor is the width of the base region. By controlling of the base region, the current-transfer ratio, either alpha or beta, may be controlled.

The transistors required for most applications must have electrical characteristics which fall within a relatively narrow range. For instance, the transistor specifications might require that the $h_{fe}$ be within a particular narrow range such as between 9 and 20.

In producing transistors from wafers cut from a double-doped or rate-grown junction semiconductor crystal, the $h_{fe}$ of the resulting transistors has been found to vary over a wide range, say from 0 to over 300. Heretofore, if transistors were needed which required a particular narrow range of $h_{fe}$, as between 9 and 20, these transistors would be obtained by selecting those few transistor wafers having the desired $h_{fe}$ from a run of many transistor wafers having a wide range of $h_{fe}$. Such a procedure is quite inefficient because if, for example, only 20% of the transistors in a given batch have the desired $h_{fe}$, it would require five runs to produce the same number of transistors having the same characteristics as could be produced if all the transistors in a given run were within the allowed $h_{fe}$ range.

Transistors produced from a grown-diffused type grown-junction semiconductor crystal will have much uniform current transfer ratio, as there are fewer variables and the variables are easier to control. For example, approximately 70% of the transistors made from a grown-diffused crystals will fall within a relatively narrow range. However, the problem remains of adjusting the value of $h_{fe}$ so that it will fall within the desired tolerance.

By the expeditious choice of impurity concentrations in the melt, choosing an impurity with a known coefficient diffusion and maintaining a proper temperature for a proper time, it is possible to grow a grown-diffused transistor crystal in which most of the wafers cut therefrom will have the desired values of $h_{fe}$. However, if a fast-diffusing impurity is utilized, there will be very little difference in the diffusion times required to obtain the various ranges of $h_{fe}$'s, and the process will be difficult to control because of this small time differential. In addition, it would be exceedingly difficult, if not impossible, to achieve the extremely narrow base region required for units which operate at the higher frequencies. If a slower diffusing impurity were used, it would be possible to grow a crystal which would have a uniformly narrow base region. Approximately 70% of the bars cut from this crystal would have a value of $h_{fe}$ which would fall within a desired range. However, it might be necessary to diffuse the crystal for as long as thirty minutes to obtain a base region of the required width to produce bars having a low value of $h_{fe}$. Alternatively, the crystal could be grown with a relatively narrow base region and then placed in a diffusion furnace at a temperature of, for instance, 1200° C. to allow further diffusion to take place and, hence, widen the base region. This is a relatively expensive process because of the expensive equipment required and the small quantity of material which can be placed in the diffusion furnace at any one time.

Accordingly, it is a principal object of the present invention to provide a grown-diffused technique for fabricating transistor crystals in which the current-transfer ratio of the transistors cut from a given crystal is kept within a relatively narrow preselected range. This is accomplished by carefully controlling the widths of the base regions of the transistors during the crystal growing and diffusion process, without changing any of the other transistor parameters or characteristics.

It is a further object of the present invention to provide a novel, simple, and efficient method for mass producing grown-diffused semiconductor crystals in which a mixture of impurity materials of the same conductivity type, in proportions determined by the diffusion rates of the impurities, is used to vary the base width of the crystals so that transistors having differing current-transfer ratios but the same base resistivity and other electrical characteristics may be produced.

Other and further objects, advantages, and characteristic features of the present invention will become readily apparent from the following detailed description of preferred embodiments of the invention when taken in conjunction with the appended drawings in which.

Figure 4:
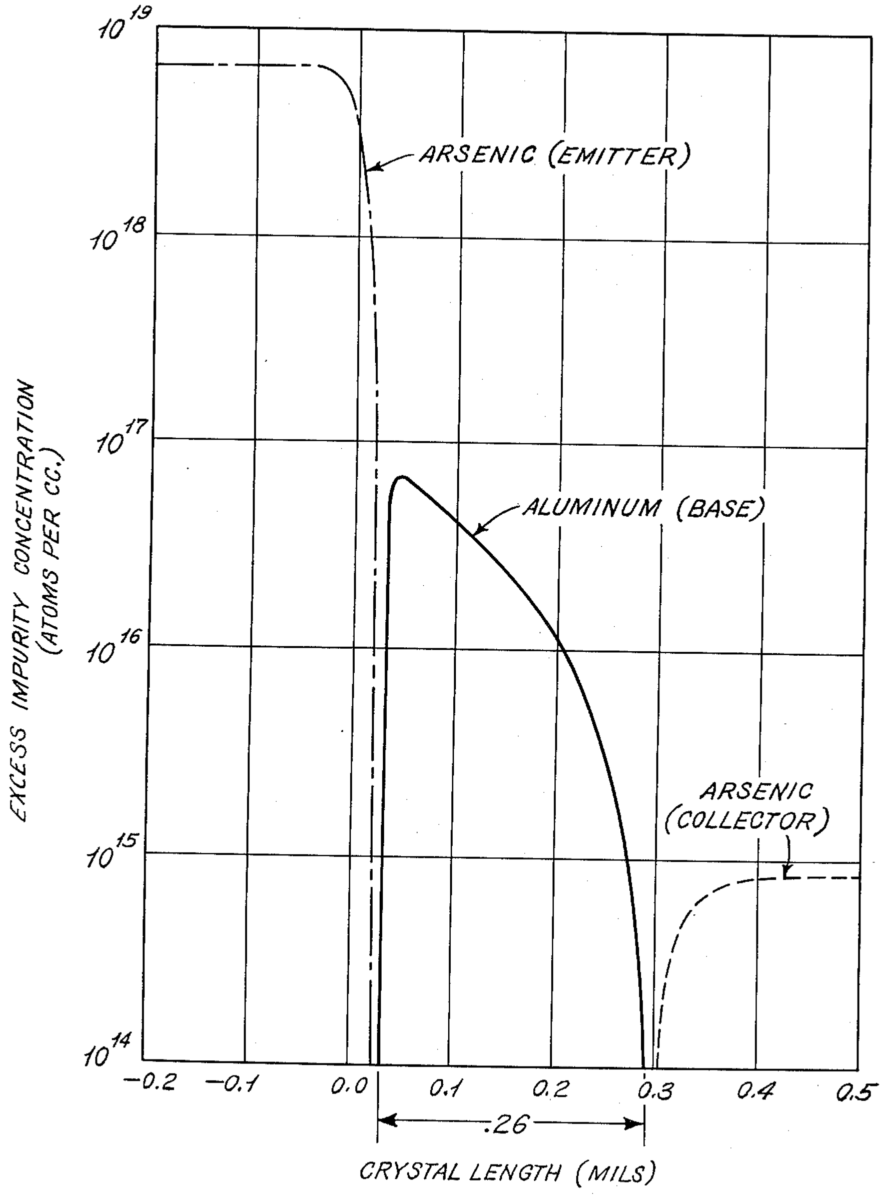
Figure 5:
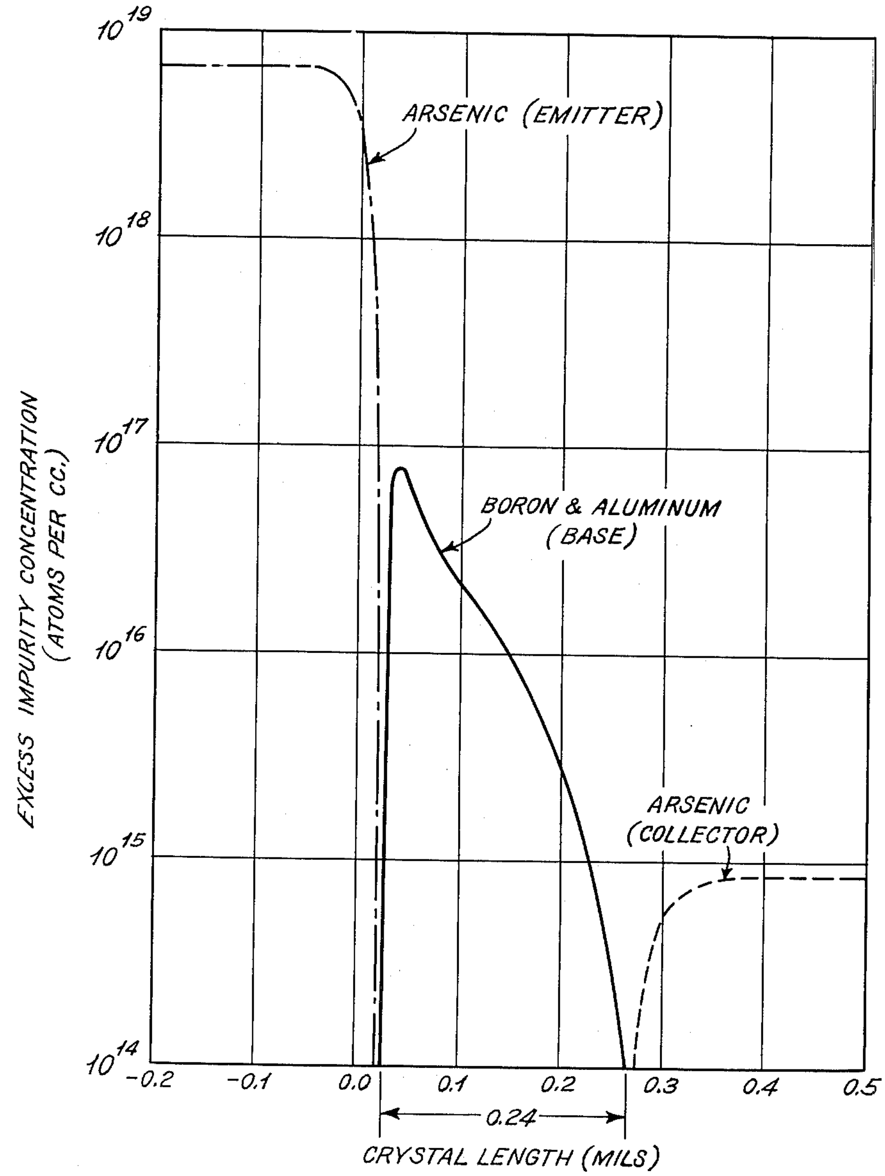

FIGURE 4 is a graph illustrating the concentrations of impurity materials in the regions of a grown-diffused transistor crystal plotted against crystal length when aluminum is used as the base-impurity material; and FIGURE 5 is a graph illustrating the concentrations of impurity materials in the various regions of a grown-diffused transistor crystal plotted against crystal length when a mixture of aluminum and boron is used as the base-impurity material.

Briefly, according to the present invention all crystals are grown the same. The total impurity concentrations, the temperatures, and the times are the same for all crystals. The only variance is that the composition of the material used for doping the base layer is changed. The base dope is composed of a fast diffusing impurity and a slow diffusing impurity. As the distance an impurity material will diffuse is dependent upon the initial concentration if the diffusion time and temperature is kept constant, the base width and hence the current transfer ratio can be controlled by adjusting initial concentration of the fast-diffusing base impurity.

A sufficient amount of the slow-diffusing base impurity is used in each crystal to maintain the maximum uncompensated impurity concentration in the base region of all crystals to the desired level. In this manner, the desired low-base resistivity adjacent the base-emitter junction is maintained for all crystals.

Figure 1:
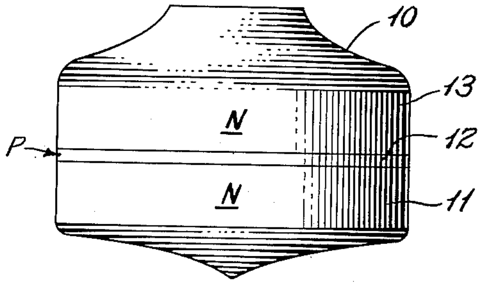
FIGURE 1 shows a grown-diffused transistor crystal fabricated in accordance with the principles of the present invention.

Referring now to FIGURE 1 of the drawings, there is shown a transistor crystal 10 which has been produced according to the grown-diffusion technique of the present invention. In the following specific example of the invention, the crystal 10 is silicon and has an N-type emitter region 11, a P-type base region 12, and an N-type collector 13. It should be pointed out that, although the invention is illustrated with reference to an NPN transistor configuration, the principles of the invention apply equally well to PNP transistors. Other materials such as germanium or the compound semiconductors may be used. The specific example shown and described is given solely for illustrative purposes, and is in no way intended to limit the scope of the invention.

Figure 2:
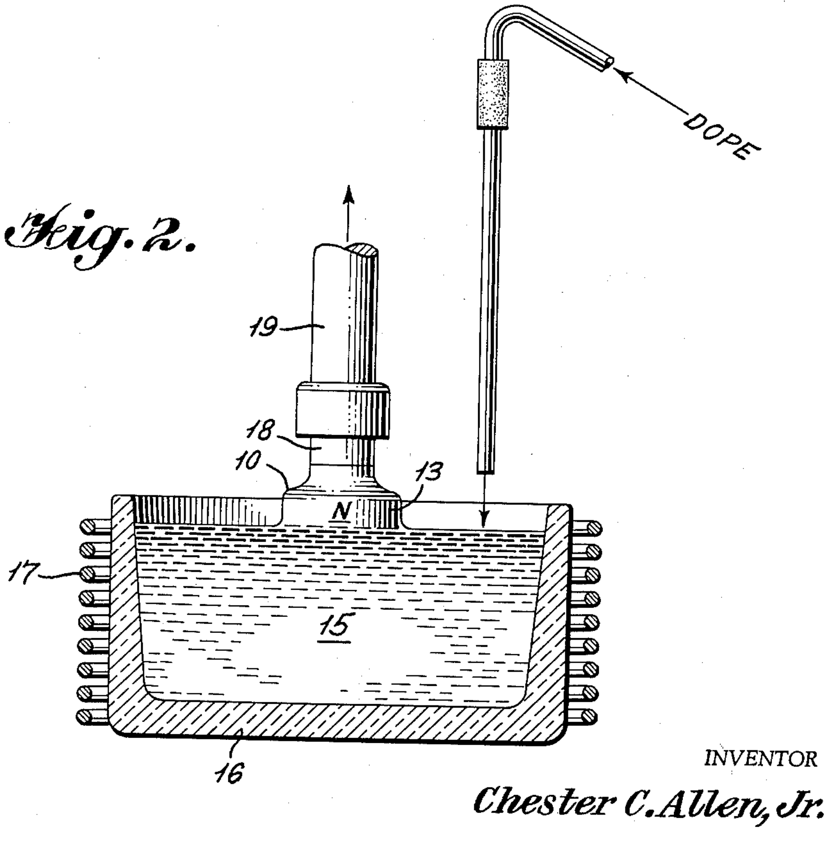
FIGURE 2 illustrates the crystal of FIGURE 1 being grown in accordance with the technique of the invention.

FIGURE 2 illustrates the apparatus used for growing the transistor crystal of FIGURE 1, showing the transistor crystal 10 in the process of being grown. A melt 15 of silicon is contained in a crucible 16 which may be quartz. The melt is heated by an energy source 17, which may be a resistance heater or a radio-frequency induction heater.

The use of the apparatus of FIGURE 2 to produce transistor crystals according to the techniques of the present invention will now be described.

First, the melt 15 of silicon and the collector impurity material is prepared and placed in the crucible 16. The charge of silicon is melted and the temperature is adjusted close to the freezing point of silicon. The seed 18 mounted on the bottom of shaft 19 is immersed in the melt 15, and the crystal growth is begun by controlling the melt temperature. After the crystal growth has begun and the top of the crystal has formed, the shaft 19 is pulled upward at a rate of approximately 0.5 mil per second. As the crystal is grown, the temperature of the melt is adjusted to cause the crystal to grow with the approximate shape shown in FIGURE 1. After the collector region has reached the desired width, the pull rate is reduced to 0.07 mil per second and the temperature is increased to stop the growth and cause the crystal to melt back. The base and emitter dopes are added and allowed to mix into the melt. After approximately two minutes, growth of the crystal is then resumed at a rate of approximately 0.5 mil per second, and the emitter portion 11 of crystal 10 is grown. The base 12 is formed by diffusion of the base dope into the last grown portion of the collector region 13.

Arsenic is the preferred collector impurity, with the arsenic present in the silicon melt at an initial concentration of approximately 1.5 times $10^{15}$ atoms per $cm.^3$. The concentration of collector impurity can be varied to produce different resistivity, with a collector resistivity of between 1.2 and 2.2 ohm centimeters being preferred. The preferred P-type impurity materials for forming the base region are boron and aluminum, although other P-type impurity materials could be used. The preferred impurity material for the emitter region is arsenic.

Since during the growth of the crystals, the impurity doping level, the growth time, and the temperature are the same for all crystals, the width of the base layer is dependent upon the diffusion rate of the impurity used to form the base layer. Different impurities, of course, have different diffustion rates. For convenience with respect to the following explanation, the diffusion constant D, which is indicative of the diffusion rate, is given below in Table I for several impurity materials. The values of D specifically apply to diffusion into silicon at a temperature of 1200° C.

*Table I*

| Element | Conductivity Type Producing | D ($cm.^2$ per sec.) |
|---|---|---|
| Al | P | $13.0 \times 10^{-12}$ |
| Ga | P | $4.1 \times 10^{-12}$ |
| B | P | $2.8 \times 10^{-12}$ |
| In | P | $8.3 \times 10^{-13}$ |
| P | N | $2.8 \times 10^{-12}$ |
| As | N | $2.7 \times 10^{-13}$ |
| Sb | N | $2.2 \times 10^{-13}$ |
| Bi | N | $2.0 \times 10^{-13}$ |

In the present invention, the base dope is composed of a mixture of several impurities of the same conductivity type which have different diffusion rates. Preferably, boron and aluminum are the impurities used. It will be evident from Table I that aluminum is a relatively fast diffuser, while boron is a much slower diffusing impurity. It should be understood that the scope of the invention is not limited to the use of just aluminum and boron, or even to any two impurities, but is intended to include any workable mixture of impurities, having different diffusion rates. It is important, however, that both P-type impurities diffuse at a faster rate than the N-type impurities. It has been found that aluminum and boron produce better results than other combinations of impurities which have been tried, and for this reason, the following discussion will be directed to the use of these specific elements as base impurities.

Figure 3:
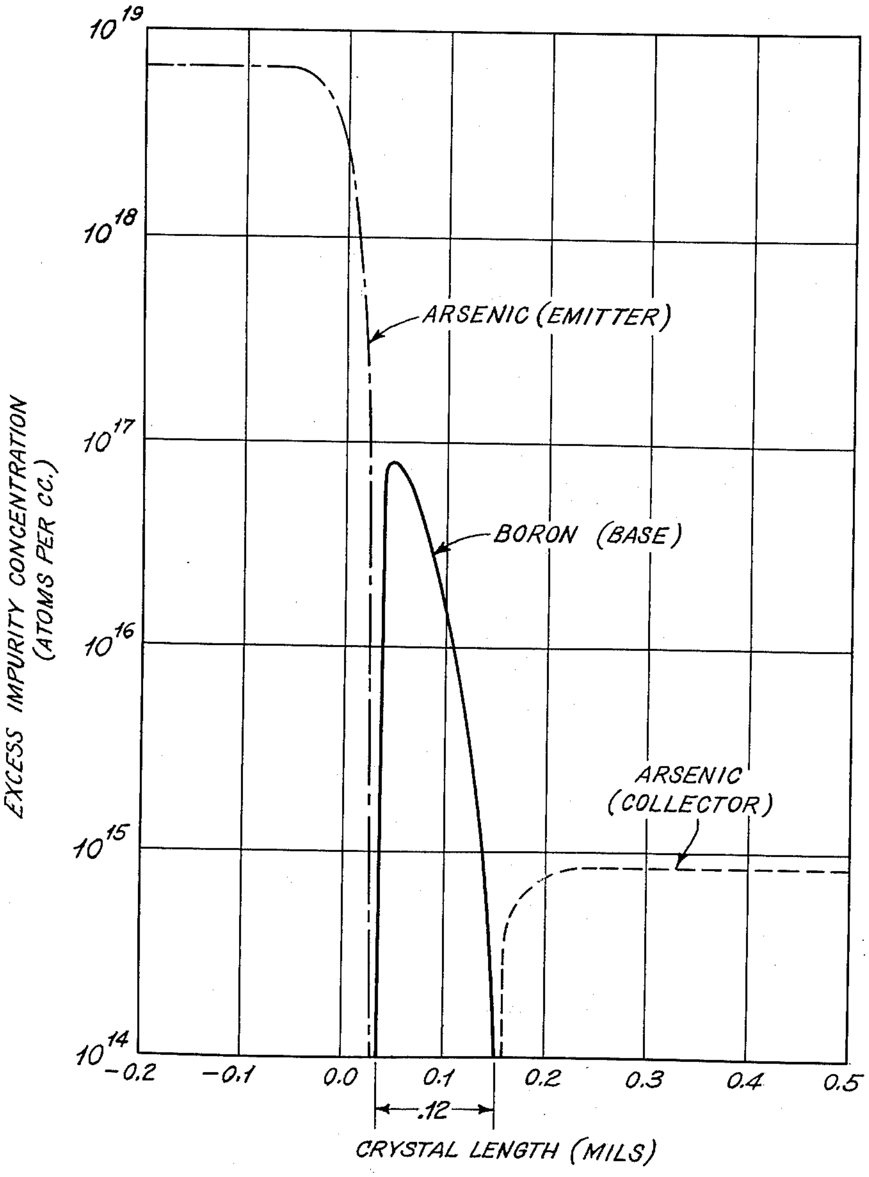
FIGURE 3 is a graph showing the concentrations of impurity materials in the regions of a grown-diffused transistor crystal plotted against crystal length when boron is used as the base impurity.

In FIGURE 3, there is shown a graph of the concentration of impurities in the respective regions of a grown-diffused transistor crystal plotted against the length of the crystal. Arsenic is used as the emitter and collector dope and boron alone as the base impurity. Because of its slow diffusion rate, when the boron is allowed to diffuse into the collector region of the crystal for a predetermined time, a base width of approximately .12 mil is achieved.

FIGURE 4 shows the impurity concentration in a grown-diffused crystal with arsenic used as the emitter and collector impurities, but with aluminum employed as the base dope. Aluminum has a much faster diffusion rate than boron, and, for the same diffusion time and temperature as that allowed for boron in the example of FIGURE 3 and with the same concentrations, aluminum is able to diffuse further into the collector region of the crystal. As is illustrated in FIGURE 4, aluminum, under the same conditions, is able to produce a base region having a width of .26 mil.

FIGURE 5 shows the impurity concentration in a grown-diffused crystal with arsenic used as the emitter and collector impurities and a mixture of aluminum and boron employed as the base impurities. It is observed that the maximum uncompensated concentration of P-type dope is the same as that shown in FIGURES 3 and 4, thus maintaining the base resistance of bars cut from the three crystals constant. The resultant base layer has a width of approximately .24 mil.

The data used in the following chart was obtained by testing transistor bars cut from crystals grown using the principles of this invention. The unit type and the $h_{fe}$ tolerance are standard designations and specifications set by the Radio and Television Manufacturers Association. The boron referred to as an impurity material is an alloy comprising .4% boron and the rest silicon.

| Type Unit | $h_{fe}$ | Base Impurity | | Yield, Percent |
|---|---|---|---|---|
| | | Al, mg. | B, mg. | |
| 2N332 | 9–20 | 40 | 0 | 75 |
| 2N333 | 18–40 | 30 | 10 | 74 |
| 2N335 | 36–90 | 20 | 20 | 71 |
| 2N336 | 76–333 | 10 | 40 | 69 |

The present invention has been illustrated with reference to an NPN transistor, and more specifically with arsenic used as the dope for the emitter and collector. The P-type base region of desired width is produced by a carefully controlled mixture of aluminum and boron. It should be obvious that when fabricating NPN transistor crystals, N-type impurities other than arsenic (e.g. phosphorous, antimony, or bismuth) could be used to form the N-type regions. Similarly, aluminum and boron need not be used to form the base region, but various combinations of at least two of the P-type impurities—aluminum, gallium, boron, and indium—may be employed depending on the desired base width and resistivity. Moreover, the invention need not be limited to NPN transistors, but PNP devices may be produced utilizing the principles of the invention.

It should be evident that by using a mixture of impurities of the same conductivity type and having different diffusion rates to produce the base region, the width of the base may be accurately controlled. Furthermore, since the diffusion temperature, impurity doping level, and diffusion time are maintained constant, the current transfer ratio is controlled and kept within a narrow tolerance. This ensures that the transistors produced from a given grown-diffused crystal will have a current-transfer ratio which will be within a relatively narrow preselected range.

Although the present invention has been shown and described with respect to a particular embodiment, nevertheless, various changes and modifications obvious to those skilled in the art are deemed to be within the spirit, scope, and contemplation of the invention.

What is claimed is:

1. A method for fabricating transistor bars having different current-transfer ratios while maintaining the other electrical characteristics constant which comprises growing separate first crystal sections from separate melts of a first-type conductivity, adding to each of said melts a different mixture of at least two impurity materials of a second-type conductivity, having different diffusion rates which are both greater than that of the impurity material producing said first-type conductivity, in ratios to variably diffuse into said first crystal sections to form varying width base regions while maintaining maximum excess impurity concentration in said bases constant, and growing on each of said crystals a third region of said first-type conductivity.

2. A method for fabricating transistor bars as defined in claim 1 wherein said melt is silicon.

3. A method for fabricating transistor bars as defined in claim 2 wherein said second-type conductivity materials comprise aluminum and boron.

4. A method of fabricating transistor crystals having differing base widths while maintaining other characteristics uniform, comprising growing first crystal sections from melts of semiconductor material characterized by N-type impurity predominance, adding to each of said melts simultaneously at least two P-type impurity materials, having different diffusion rates which are both greater than that of the N-type impurity, in ratios to variably diffuse into said first crystal sections to form varying width base regions while maintaining a uniform maximum excess impurity concentration in said bases, and growing on each of said crystals an additional section having N-type conductivity.

References Cited in the file of this patent

UNITED STATES PATENTS 2,822,308 Hall ---------------- Feb. 4, 1958
2,899,343 Statz ---------------- Aug. 11, 1959
2,950,219 Pohl ---------------- Aug. 23, 1960

FOREIGN PATENTS 779,666 Great Britain ---------- July 24, 1957